Oct. 25, 1927.
M. RACZ
1,646,794
TELESCOPIC SIDE INCLOSURE FOR VEHICLES
Filed Oct. 21, 1926     2 Sheets-Sheet 1
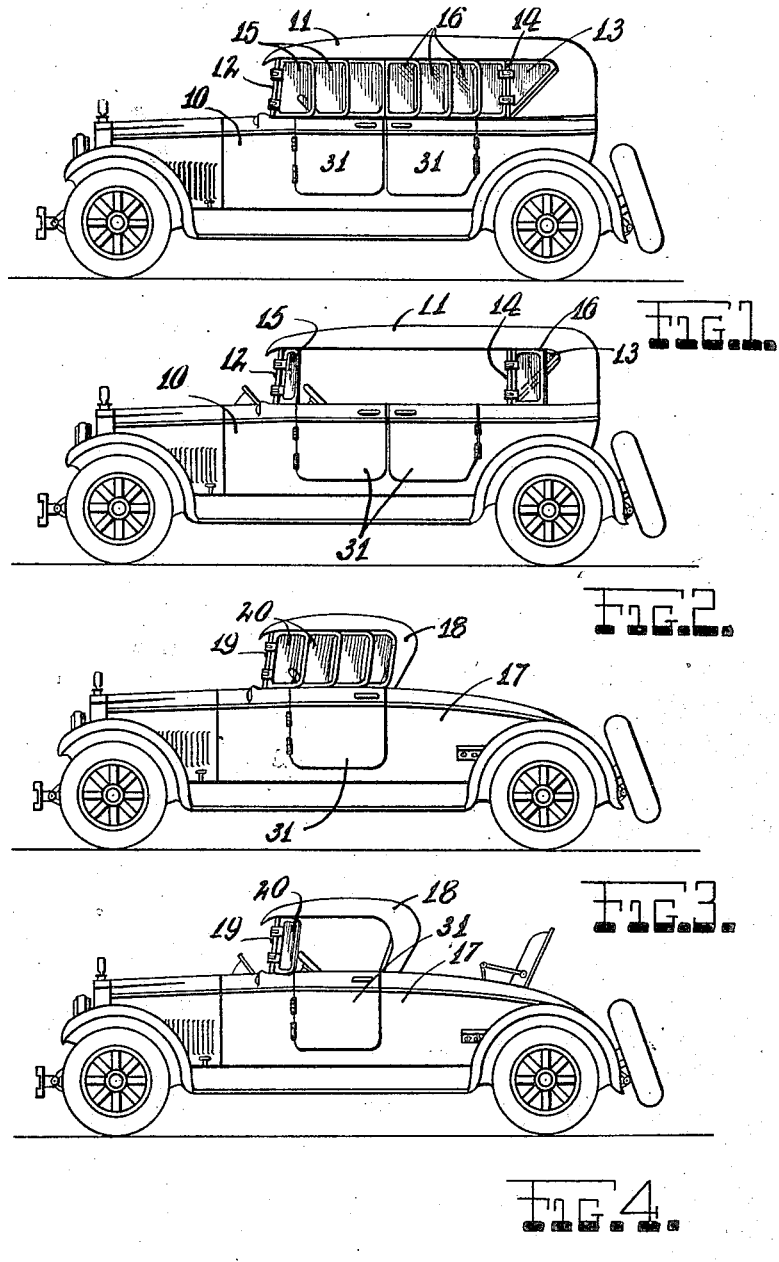
INVENTOR.
Michael Racz
BY
Zoltan H. Polachek
ATTORNEY.

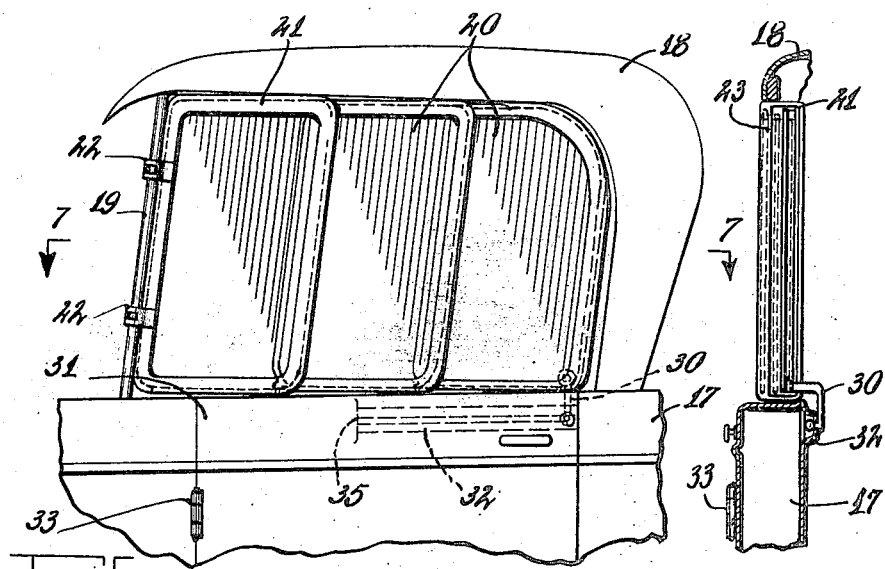

Patented Oct. 25, 1927.

1,646,794

UNITED STATES PATENT OFFICE.

MICHAEL RACZ, OF PHILADELPHIA, PENNSYLVANIA.

TELESCOPIC SIDE INCLOSURE FOR VEHICLES.

Application filed October 21, 1926. Serial No. 143,043.

This invention relates generally to motor vehicles, or the like, and has more particular reference to a novel type of telescopic side windshield wing curtain therefor.

The invention has for an object the provision of an improved telescopic side windshield wing curtain which will operate efficiently, and which can be manufactured and sold at a reasonable cost.

The invention has for a further object the provision of an improved telescopic side windshield wing curtain which will make a closed car out of an open one by simply a sliding operation.

For further comprehension of the invention, and of the objects and advantages thereof, reference will be had to the following description and accompanying drawing, and to the appended claims in which the various novel features of the invention are more particularly set forth.

Referring to the drawing forming a material part of this disclosure:—

Fig. 1 is a side elevational view of a touring car with the invention device in closed position applied thereto.

Fig. 2 is a similar view, but the invention device is in opened position.

Fig. 3 is a side elevational view of a roadster with the invention device in closed position applied thereto.

Fig. 4 is a similar view, but the invention device is in opened position.

Fig. 5 is a fragmentary enlarged side elevation of a car with the invention device applied thereto.

Fig. 6 is a side view thereof.

Fig. 7 is a horizontal sectional view, taken on the line 7—7 of Fig. 5.

Fig. 8 is a plan elevation of the invention device in closed condition.

Fig. 9 is a fragmentary sectional view, taken on the line 9—9 of Fig. 7.

Fig. 10 is a fragmentary sectional view, taken on the line 10—10 of Fig. 7.

The reference numeral 10 indicates generally a touring car having the usual top cover 11, and front posts 12 supporting the front windshield, not shown on the drawing, and the top cover 11. A rear end window 13 is fixed to the back of the top cover 11, and vertical bars 14 extend from the top cover 11 to the car 10. The telescopic panels 15 are connected to the front posts 12, and the panels 16 are connected to the bars 14, as described in detail further on. In Fig. 2 the panels 15 are telescoped together, and likewise the panels 16.

The reference numeral 17 indicates generally a roadster car, having the usual top cover 18, and front posts 19 supporting the front windshield, not shown on the drawing, and the top cover 18. Telescopic panels 20 are connected to the front posts 19, as described below, and shown in Fig. 3 extended, and in Fig. 4 collapsed.

An end frame 21 has the panel 20 of suitable transparent material secured on its front side, and is equipped with edge hinges 22 engaging the front post 19. The edge of the end frame 21 opposite the hinge 22 is open, and a center frame 23 is slidably engaged in the opening. The end frame 21 has on its bottom edge a groove 24 which is engaged by a pin 25 projecting from a boss 26 depending from the center frame 23. The front side of the center frame 23 has secured thereto one of the panels 20. Another frame 26 is slidably engaged in the edge of the center frame 23 remote from the end frame 21. The center frame 23 has on its bottom edge a groove 27 which is engaged by a pin 28 projecting from the bottom of the frame 26. The frame 26 has secured thereto one of the panels 20. Fig. 7 of the drawing shows the various frames in extended position, and Fig. 8 illustrates them in collapsed position, or in words, the panels are telescopically arranged.

The frame 26 has pivotally attached at its lower edge a finger 30. The doors 31 of the cars 10 and 17 are formed with a projecting grooved member 32 into which the bottom end of the finger 30 engages. The door 31 swings open on hinges 33, and the panels 20 on hinges 22, the finger 30 sliding in the grooved member 32 to permit of this swinging. The grooved member 32 starts, as at 35 a small distance from the end of the frame 21 so that when the panels are collapsed the finger 30 disengages from the groove member, permitting an independent operation of the door 31.

The panels 15, 16 are constructed the same as panels 20, and are provided with fingers, not shown on the drawing, engaging the doors 31, as shown in Figs. 5 to 9.

While I have illustrated and described my invention with some degree of particularity I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. In a vehicle having posts extending from the top cover to the vehicle and in combination with the doors of the vehicle, an end frame hingedly secured to the posts, the edge of the end frame opposite the hinge connection being open, a central frame slidable in the opening, means for slidably holding the frames in engagement, another frame slidable in the edge of the center frame remote from the end frame, means for slidably holding the last mentioned frame in engagement with the center frame, a projecting grooved member on the door, and means for slidably engaging the frame remote from the end frame to the projecting grooved member.

2. In a vehicle having posts extending from the top cover to the vehicle and in combination with the doors of the vehicle, an end frame hingedly secured to the posts, the edge of the end frame opposite the hinge connection being open, a central frame slidable in the opening, means for slidably holding the frames in engagement, another frame slidable in the edge of the center frame remote from the end frame, means for slidably holding the last mentioned frame in engagement with the center frame, panels secured to the frames, a projecting grooved member on the door, and means for slidably engaging the frame remote from the end frame to the projecting grooved member.

3. In a vehicle having posts extending from the top cover to the vehicle and in combination with the doors of the vehicle, an end frame hingedly secured to the posts, the edge of the end frame opposite the hinge connection being open, a central frame slidable in the opening, means for slidably holding the frames in engagement, another frame slidable in the edge of the center frame remote from the end frame, means for slidably holding the last mentioned frame in engagement with the center frame, a projecting grooved member on the door, and means for slidably engaging the frame remote from the end frame to the projecting grooved member, said latter means consisting of a finger pivotally attached to the frame and slidable in the grooved member.

4. In a vehicle having posts extending from the top cover to the vehicle and in combination with the doors of the vehicle, an end frame hingedly secured to the posts, the edge of the end frame opposite the hinge connection being open, a central frame slidable in the opening, another frame slidable in the edge of the center frame remote from the end frame, means for slidably holding the frames in engagement with each other, a projecting grooved member on the door, and means for slidably engaging the frame remote from the end frame to the projecting grooved member.

5. In a vehicle having posts extending from the top cover to the vehicle and in combination with the doors of the vehicle, an end frame hingedly secured to the posts, the edge side of the end frame opposite the hinge connection being open, a central frame slidable in the opening, another frame slidable in the edge of the center frame remote from the end frame, means for slidably holding frames in engagement with each other, a projecting grooved member on the door, and means for slidably engaging the frame remote from the end frame to the projecting grooved member, said latter means consisting of a finger pivotally attached to the frame and slidable in the grooved member whereby the frames and door swing as a unit.

6. In a vehicle having posts extending from the top cover to the vehicle and in combination with the doors of the vehicle, an end frame hingedly secured to the posts, the edge of the end frame opposite the hinge connection being open, a central frame slidable in the opening, a pin projecting from one frame and engaging in a groove in the other frame, for slidably holding the frames in engagement, another frame slidable in the edge of the center frame remote from the end frame, a pin projecting from the last mentioned frame and engaging in a groove in the center frame for slidably holding the last mentioned frame in engagement with the center frame, a projecting grooved member on the door, and means for slidably engaging the frame remote from the end frame to the projecting grooved member.

In testimony whereof I have affixed my signature.

MICHAEL RACZ.